United States Patent
Tsirkin

(10) Patent No.: US 9,858,098 B2
(45) Date of Patent: Jan. 2, 2018

(54) HYPERVISOR MODIFICATION OF SYSTEM TABLES

(71) Applicant: Red Hat Israel, Ltd., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 626 days.

(21) Appl. No.: 13/725,910

(22) Filed: Dec. 21, 2012

(65) Prior Publication Data

US 2014/0181811 A1    Jun. 26, 2014

(51) Int. Cl.
*G06F 9/455*    (2006.01)

(52) U.S. Cl.
CPC .............. *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 2003/0033547 A1* | 2/2003 | Larson | G06F 1/28 713/300 |
| 2004/0162976 A1* | 8/2004 | Yakovlev | 713/1 |
| 2004/0205776 A1* | 10/2004 | Harrington | G06F 8/67 719/320 |
| 2005/0216920 A1* | 9/2005 | Tewari | G06F 9/5011 719/324 |
| 2007/0156942 A1* | 7/2007 | Gough | 710/302 |
| 2008/0052721 A1* | 2/2008 | Rangarajan | G06F 9/5016 718/105 |
| 2009/0271785 A1* | 10/2009 | Kawagome | G06F 9/45533 718/1 |
| 2014/0298340 A1* | 10/2014 | Imaizumi | G06F 12/0284 718/1 |

* cited by examiner

*Primary Examiner* — Paul J Yen
(74) *Attorney, Agent, or Firm* — Lowenstein Sandler LLP

(57) ABSTRACT

A system and method for system table modification in a virtualized computer system are disclosed. In accordance with one embodiment, a hypervisor that is executed by a computer system detects a hardware configuration change to the computer system (e.g., addition of a hardware device to the computer system, removal of a hardware device from the computer system, a change in configuration of a hardware device of the computer system, etc.). In response, the hypervisor modifies a system table that is accessible by a guest operating system executing within a virtual machine.

18 Claims, 5 Drawing Sheets

HYPERVISOR MODIFICATION OF SYSTEM TABLES

TECHNICAL FIELD

This disclosure relates to computer operating systems, and more particularly, to modifying system tables of an operating system.

BACKGROUND

An operating system (OS) is a set of programs that manage computer hardware resources and provide common services for application software. For hardware functions such as input and output and memory allocation, the operating system typically acts as an intermediary between application programs and hardware. Operating systems may be found on a variety of devices, including desktop computers, servers, smartphones, video game consoles, and so forth.

The Advanced Configuration and Power Interface (ACPI) specification provides an open standard for device configuration and power management by the operating system. The ACPI specification defines four global "Gx" states G0 through G3, six sleep "Sx" states S0 through S5, four device states D0 through D3, four processor states C0 through C3, and up to 17 implementation-dependent power-performance states P0 through Pn, where n is an integer between 1 and 16 inclusive. In addition, ACPI defines several tables that provide an interface between an ACPI-compliant operating system and system firmware, including a Differentiated System Description Table (DSDT), a Secondary System Description Table (SSDT), and a System Resource Affinity Table (SRAT).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for modifying Advanced Configuration and Power Interface (ACPI) tables in a virtualized computer system. In one embodiment, a hypervisor detects a hardware configuration change to a computer system (e.g., addition of a hardware device to the computer system, removal of a hardware device from the computer system, a change in configuration of a hardware device of the computer system, etc.). In response, the hypervisor modifies one or more ACPI tables (e.g., a Differentiated System Description Table [DSDT], a Secondary System Description Table [SSDT], a System Resource Affinity Table [SRAT], etc.) that are accessible by a guest operating system (OS) of a virtual machine, and transmits a message to the guest OS indicating that one or more of the ACPI tables have been modified. The guest OS then reloads the ACPI tables in response to receiving the message from the hypervisor.

In one embodiment, the message transmitted by the hypervisor also specifies which particular ACPI table(s) have been modified, and the guest OS reloads only those tables, while in another embodiment, the guest OS always reloads all of the ACPI tables, regardless of whether or not the message from the hypervisor identifies the modified tables. In one embodiment, when the configuration change involves the addition of a hardware device, a description of the hardware device is also added to the system table. When the hardware device is a bridge device (e.g., a PCI bridge device, etc.), the description of the bridge device may include a description of one or more slots of the bridge device.

Embodiments of the present disclosure thus provide a mechanism by which a guest operating system in a virtualized computer system maintains an up-to-date view of ACPI tables that are accessible by the guest OS. This mechanism ensures that the guest OS's view of the ACPI tables correctly reflects hardware configuration changes to the virtualized computer system such as an addition of a new hardware device to the computer system, removal of a hardware device from the computer system, a change in configuration of an existing hardware device, or some combination thereof. Advantageously, the mechanism does not require any shutdown or restarting of the virtual machine in which the guest OS resides. Moreover, while the present disclosure is described with respect to ACPI tables, embodiments of the present disclosure may be employed for other types of operating system tables.

Figure 1:
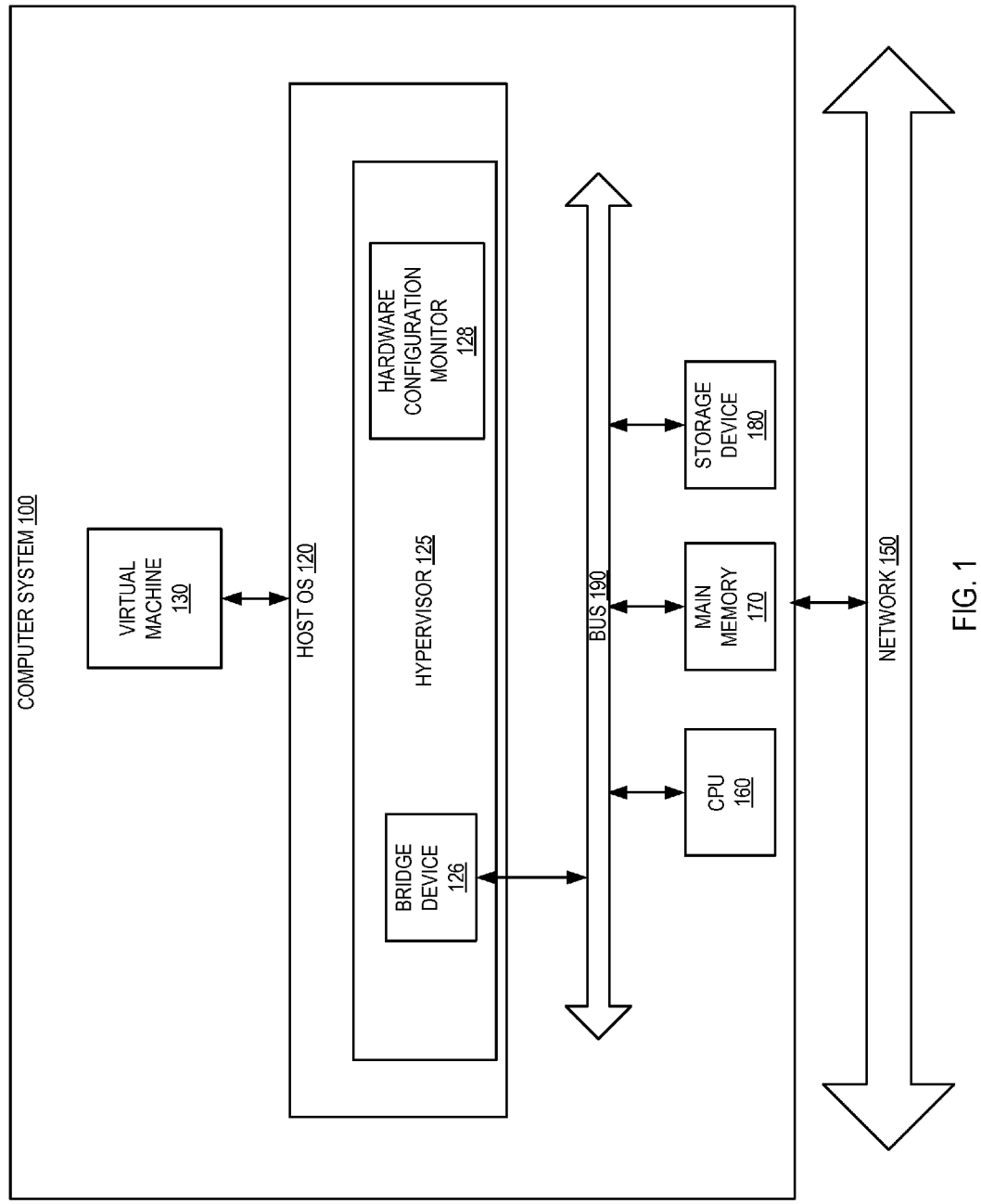
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing units (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.), connected by a bus 190 (e.g., a Peripheral Component Interconnect [PCI] bus, a Universal Serial Bus [USB}, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs.

Similarly, in some other embodiments computer system 100 may comprise a plurality of storage devices 180, rather than a single storage device 180.

Computer system 100 runs a host operating system (OS) 120, which comprises software, hardware, or both, that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. In accordance with one such example, hypervisor 125 includes or exposes to VM 130 a bridge device 126 (e.g., a PCI bridge device, etc.) that may be a physical device or a virtual device, and that may have a set of slots (e.g., PCI express slots, etc.), and that may be capable of converting individual data items pertaining to multiple read and/or write transactions on bus 190 into one larger set of data. As shown in FIG. 1, in one example hypervisor 125 may also include a hardware configuration monitor 128 that is capable of monitoring hardware devices of computer system 100 (e.g., storage device 180, other devices not depicted in FIG. 1, such as printers, scanners, etc.), as described below with respect to FIG. 3. It should be noted that in some other examples, hypervisor 125 may be external to host OS 120, rather than embedded within host OS 120.

Virtual machine 130 is a software implementation of a machine that executes programs as though it were an actual physical machine. It should be noted that although, for simplicity, a single virtual machine is depicted in FIG. 1, in some other embodiments computer system 100 may host a plurality of virtual machines. Virtual machine 130 is described in more detail below with respect to FIG. 2.

Figure 2:
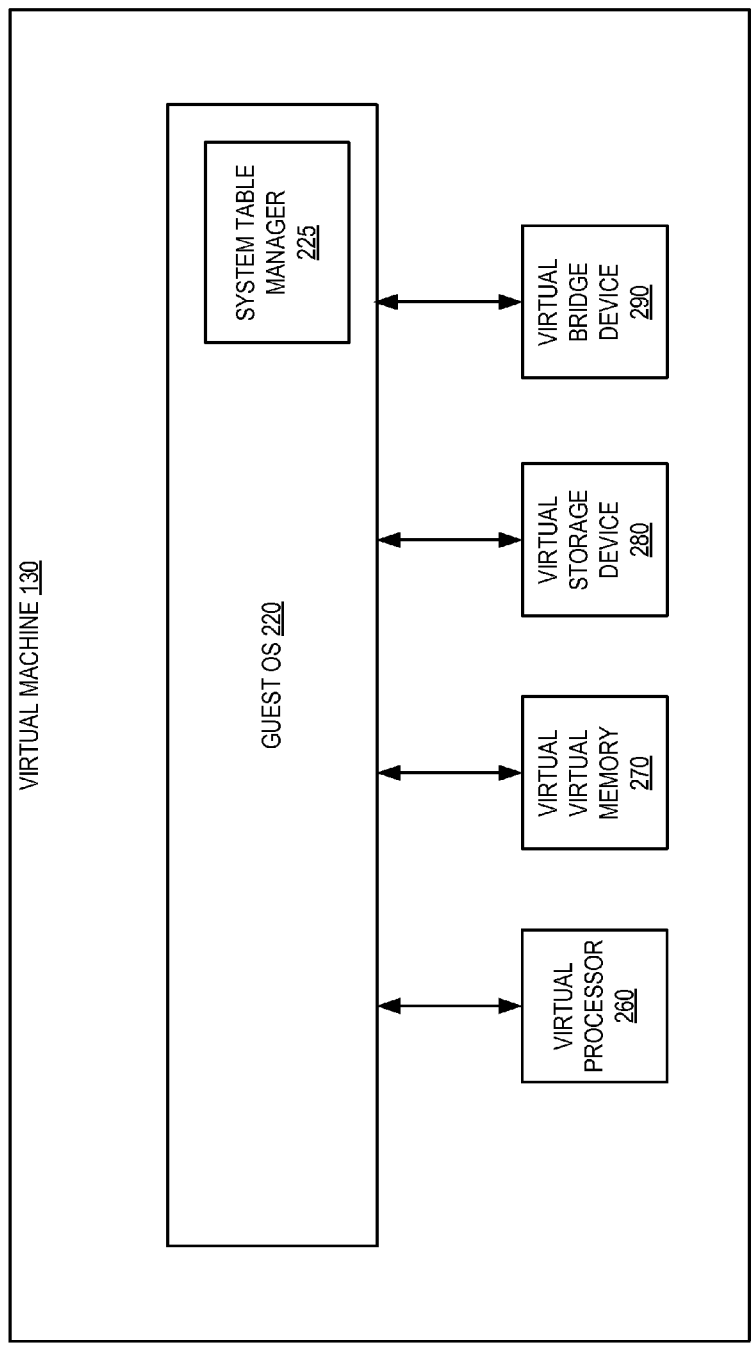
FIG. 2 depicts a block diagram of elements of a virtual machine, in accordance with an embodiment of the present disclosure.

FIG. 2 depicts a block diagram of elements of virtual machine 130, in accordance with an embodiment of the present disclosure. As shown in FIG. 2, virtual machine 130 comprises a guest operating system 220, a virtual bridge device 226, a virtual processor 260, a virtual virtual memory 270, and a virtual storage device 280.

Guest operating system (OS) 220 comprises software, hardware, or both, that manages the execution of programs within virtual machine 130. Guest OS 220 includes a system table manager 225 that receives messages from hypervisor 125 indicating that one or more system tables have been modified and that reloads the system tables, as described below with respect to FIG. 4.

Virtual processor 260 emulates a physical processor and maps to central processing unit (CPU) 160. Similarly, virtual storage device 280 emulates a physical storage device and maps to storage device 180, and virtual bridge device 290 emulates and maps to bridge device 126. Virtual virtual memory 270 maps virtual addresses of virtual machine 130 to addresses of the host OS 120's virtual memory, which in turn maps to physical addresses in main memory 170. In one embodiment, hypervisor 125 manages these mappings in a transparent fashion, so that guest OS 220 and applications executing on virtual machine 130 interact with virtual processor 260, virtual virtual memory 270, virtual storage device 280 and virtual bridge device 290 as though they were actual physical entities. As noted above, in embodiments where computer system 100 comprises a plurality of CPUs 160, rather than a single CPU, virtual machine 130 may also comprise a plurality of virtual processors 260. Similarly, in embodiments where computer system 100 comprises a plurality of storage devices 180, rather than a single storage device 180, virtual machine 130 may also comprise a plurality of storage devices 180.

Figure 3:
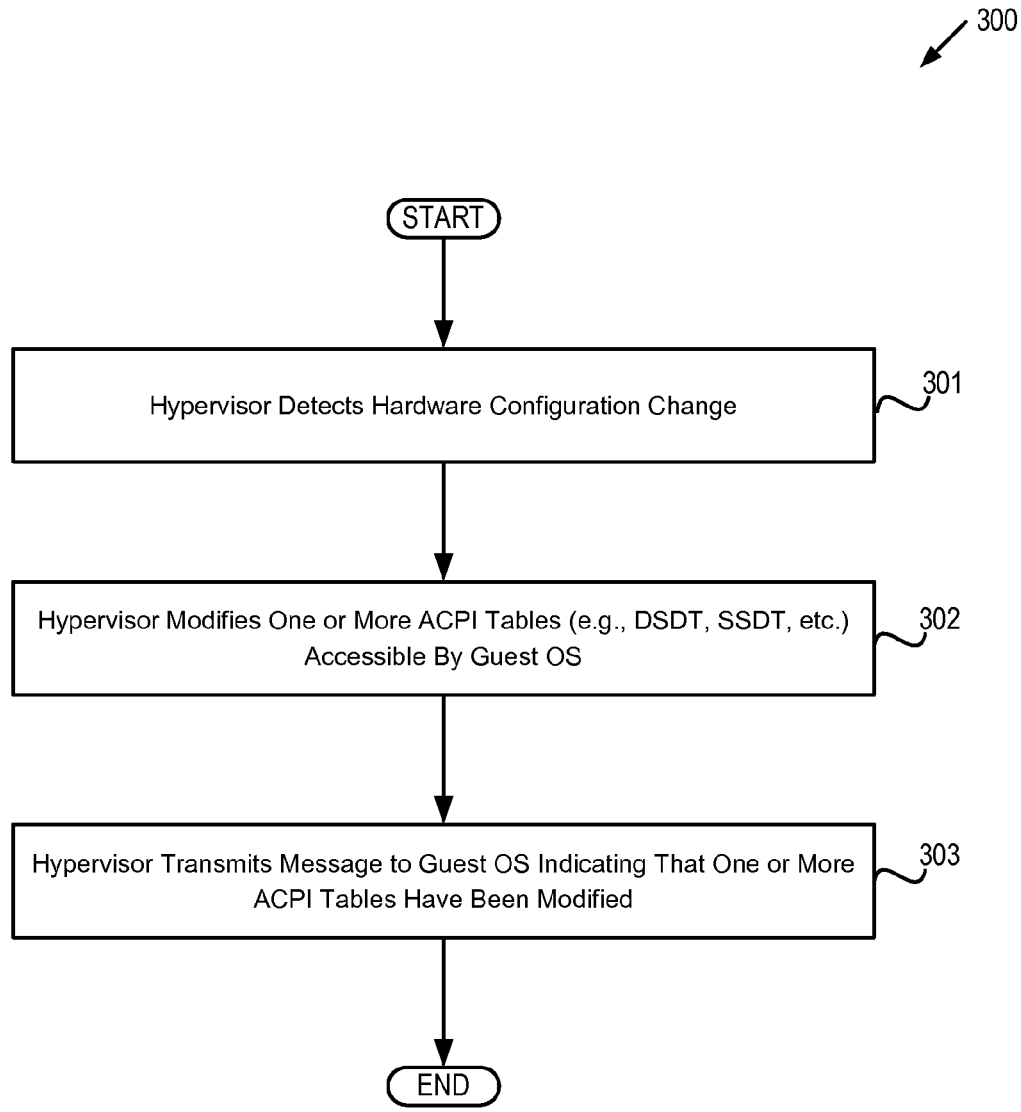
FIG. 3 depicts a flow diagram of one embodiment of a method for hypervisor modification of ACPI tables.

FIG. 3 depicts a flow diagram of one embodiment of a method 300 for hypervisor modification of ACPI tables. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted.

At block 301, hypervisor 125 detects a hardware configuration change to computer system 100 (e.g., due to a request to hypervisor 125 to expose a new virtual device or physical device to virtual machine 130, due to a request to hypervisor 125 to remove a new virtual device or physical device from virtual machine 130 that was previously exposed to the VM, etc.). The hardware configuration change may involve a hardware device such as a PCI bridge device, a storage device, a CPU, etc., and may comprise an addition of a hardware device to computer system 100, removal of a hardware device from computer system 100, a change in configuration to an existing hardware device of computer system 100, or some combination thereof. In one embodiment, block 301 is performed by hardware configuration monitor 128.

At block 302, upon detecting the hardware configuration change, hypervisor 125 modifies one or more Advanced Configuration and Power Interface (ACPI) tables (e.g., a Differentiated System Description Table [DSDT], a Secondary System Description Table [SSDT], a System Resource Affinity Table [SRAT], etc.). In one example, when the configuration change involves adding a hardware device to computer system 100, hypervisor 125 may decide which of the ACPI tables are to be modified (e.g., based on the particular hardware device added, based on a policy, etc.), and may also add a description of the new hardware device to these tables. When the new hardware device is a bridge device (e.g., a PCI bridge device, etc.), the description of the bridge device may include a description of one or more slots of the bridge device.

In another example, when the configuration change involves removing a hardware device from computer system 100, hypervisor 125 modifies the table(s) that describe that particular hardware device, and optionally, a table that describes a bus of VM 130 to which the virtual device is connected. In one embodiment, block 302 is performed by hardware configuration monitor 128.

At block 303, hypervisor 125 transmits a message to guest operating system (OS) 220 indicating that one or more more ACPI tables have been modified. In some embodiments, the message may also specify which particular tables have been modified. In one embodiment, block 303 is performed by hardware configuration monitor 128.

Figure 4:
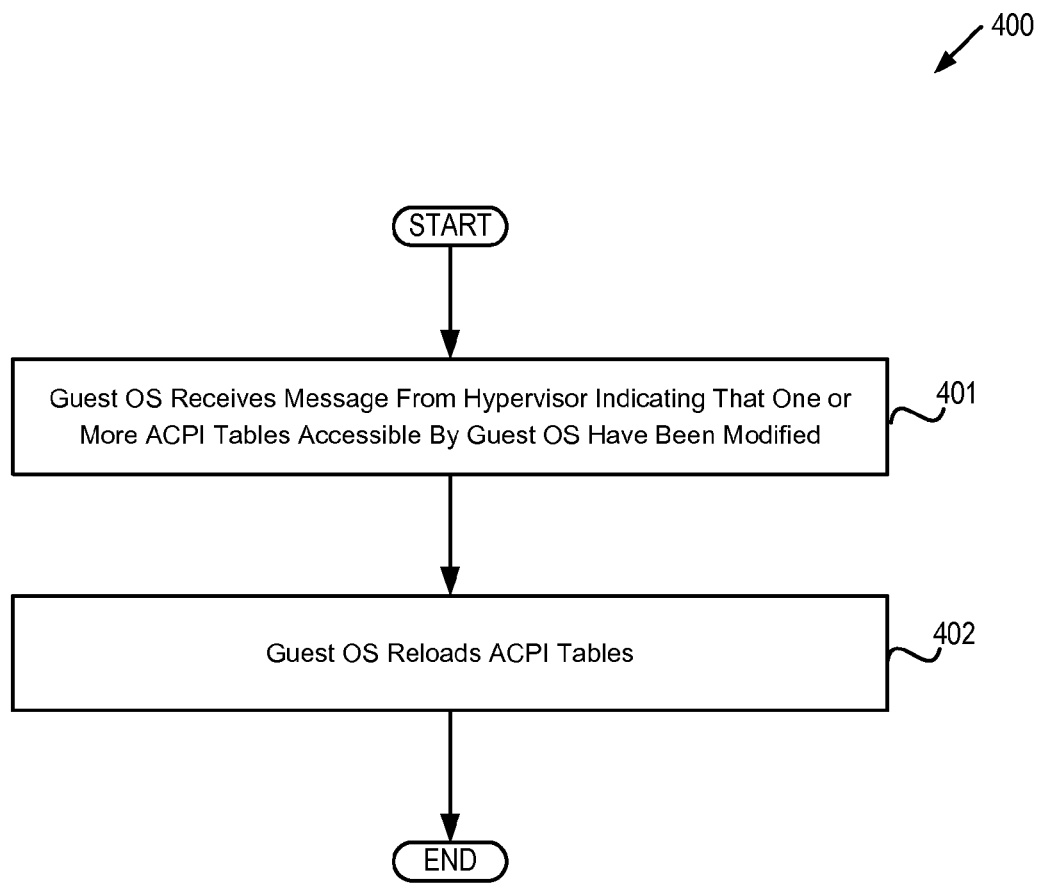
FIG. 4 depicts a flow diagram of one embodiment of a method by which a guest operating system handles hypervisor modification of ACPI tables.

FIG. 4 depicts a flow diagram of one embodiment of a method 400 by which a guest operating system (OS) handles hypervisor modification of ACPI tables. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 4 may be performed simultaneously or in a different order than that depicted.

At block 401, guest OS 220 receives a message from hypervisor 125 indicating that one or more ACPI tables accessible by the guest OS have been modified. In some embodiments, the message may specify which particular tables have been modified, while in some other embodiments, the message may indicate only that a change has occurred. In one embodiment, block 401 is performed by system table manager 225.

At block 402, guest OS 220 reloads the ACPI tables in response to the message received at block 401. In some embodiments, all of the ACPI tables accessible to guest OS 220 may be reloaded, while in some other embodiments where the message received at block 401 specifies which particular tables have been modified, only those particular tables may be reloaded. In one embodiment, system table manager 225 sends a message to an Operating System-Directed Configuration and Power Management (OSPM) Component of guest OS 220 (which is a portion of guest OS 220 that controls power management functions, such as transitioning between power management states) to reload the ACPI tables.

Figure 5:
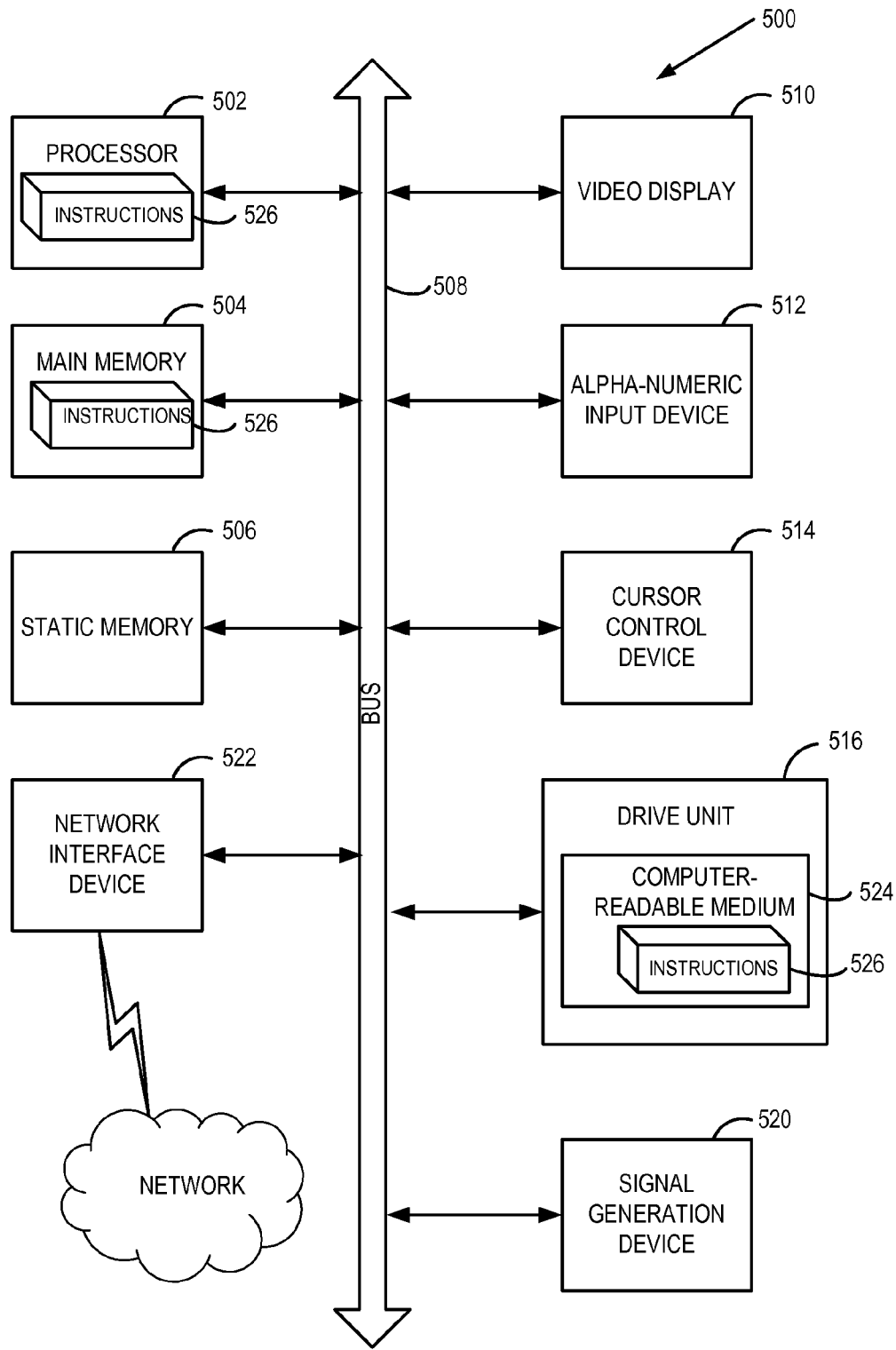
FIG. 5 depicts a block diagram of an illustrative computer system operating in accordance with embodiments of the disclosure.

FIG. 5 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 3 and 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "detecting", "modifying", "executing", "reloading", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   detecting, by a hypervisor that is executed by a processor of a computer system, a hardware configuration change to the computer system, wherein the processor executes a host operating system comprising a plurality of power management system tables and a virtual machine comprising a guest operating system;
   determining a first set of power management system tables to be modified from the plurality of power management system tables, the first set of power management tables corresponding to the hardware configuration change;
   modifying, by the processor executing the hypervisor, the first set of power management system tables of the host operating system in response to determining the first set of power management system tables to be modified; and
   transmitting to the virtual machine, by the hypervisor, a message indicating the first set of power management system tables of the host operating system that have been modified, the message to be received by the guest operating system and to cause the guest operating system to reload a copy of the first set of power management system tables of the host operating system that have been modified while preserving, and not reloading, information comprised in a second set of power management system tables that has not been modified from the plurality of power management system tables, wherein the copy of the first set of power management system tables is reloaded by the guest operating system without a shutdown or a restart of the virtual machine.

2. The method of claim 1 wherein the power management system table is an Advanced Configuration and Power Interface (ACPI) table.

3. The method of claim 2 wherein the ACPI table is a Differentiated System Description Table (DSDT) or a Secondary System Description Table (SSDT).

4. The method of claim 1 wherein the hardware configuration change comprises an addition of a hardware device to the computer system.

5. The method of claim 4 wherein the modifying of the first set of power management system tables comprises including a description of the hardware device in the system table.

6. The method of claim 5 wherein the hardware device is a bridge device, and wherein the description of the hardware device comprises a description of one or more slots of the bridge device.

7. An apparatus comprising:
   a memory to store a plurality of power management system tables of a host operating system; and
   a processor, operatively coupled to the memory, to:
      execute, within a virtual machine, a guest operating system that has access to the plurality of power management system tables of the host operating system,
      receive, via the guest operating system, a message from a hypervisor that indicates that the hypervisor has modified a first set of power management system tables of the plurality of power management system tables of the host operating system, and
      in response to receiving the message, reload, via the guest operating system, a copy of the one or more power management system tables of the host operating system that have been modified without a shutdown of the virtual machine or a restart of the virtual machine while preserving, and not reloading, information comprised in a second set of power management system tables that has not been modified from the plurality of power management system tables, wherein the first set of power management tables is reloaded by the guest operating system without a shutdown or a restart of the virtual machine.

8. The apparatus of claim 7 wherein the power management system table is an Advanced Configuration and Power Interface (ACPI) table.

9. The apparatus of claim 8 wherein the ACPI table is a Differentiated System Description Table (DSDT) or a Secondary System Description Table (SSDT).

10. The apparatus of claim 7 wherein the modifying of the power management system table by the hypervisor is in response to a hardware configuration change to the apparatus.

11. The apparatus of claim 10 wherein the hardware configuration change comprises an addition of a hardware device to the apparatus.

12. The apparatus of claim 11 wherein the power management system table is modified by including a description of the hardware device in the power management system table.

13. The apparatus of claim 12 wherein the hardware device is a Peripheral Component Interconnect (PCI) bridge device, and wherein the description of the hardware device comprises a description of one or more slots of the PCI bridge device.

14. A non-transitory computer readable storage medium, having instructions stored therein, which when executed, cause a processor of a computer system to:
  detect, by a hypervisor executed by the processor, a hardware configuration change to the computer system, wherein the processor executes a host operating system comprising a plurality of power management system tables, and a virtual machine comprising a guest operating system;
  determine a first set of power management system tables to be modified from the plurality of power management system tables, the first set of power management system tables corresponding to the hardware configuration change;
  modify, by the processor executing the hypervisor, the first set of power management system tables of the host operating system in response to the hypervisor determining the first set of power management system tables to be modified; and
  transmit to the virtual machine, by the hypervisor, a message indicating the first set of power management system tables of the host operating system that have been modified, wherein the message to be received by the guest operating system and to cause the guest operating system to reload a copy of the first set of power management system tables of the host operating system that have been modified while preserving, and not reloading, information comprised in a second set of power management system tables that have not been modified from the plurality of power management system tables, wherein the first set of power management system tables is reloaded by the guest operating system without a shutdown or a restart of the virtual machine.

15. The non-transitory computer readable storage medium of claim 14 wherein the power management system table is an Advanced Configuration and Power Interface (ACPI) table.

16. The non-transitory computer readable storage medium of claim 14 wherein the hardware configuration change comprises a removal of a hardware device from the computer system.

17. The non-transitory computer readable storage medium of claim 16 wherein to modify the system table, the processor is to remove a description of the hardware device from the first set of power management system tables.

18. The non-transitory computer readable storage medium of claim 17 wherein the hardware device is a bridge device, and wherein the description of the hardware device comprises a description of one or more slots of the bridge device.

* * * * *